United States Patent [19]
Rogers, Jr.

[11] Patent Number: 4,535,822
[45] Date of Patent: Aug. 20, 1985

[54] FITTING INSTALLATION DEVICE

[75] Inventor: Elmer V. Rogers, Jr., North Olmsted, Ohio

[73] Assignee: The Pipe Line Development Company, Cleveland, Ohio

[21] Appl. No.: 459,786

[22] Filed: Jan. 21, 1983

[51] Int. Cl.³ .............................................. F16Z 55/16
[52] U.S. Cl. ...................................... 138/99; 29/234; 29/237; 29/252
[58] Field of Search ......................... 29/237, 234, 252; 138/97, 99; 285/15, 18

[56] References Cited

U.S. PATENT DOCUMENTS

| | | | |
|---|---|---|---|
| 3,502,112 | 3/1970 | Hankila | 138/99 |
| 3,685,545 | 8/1972 | Smith et al. | 138/99 |
| 3,744,822 | 7/1973 | Arnold | 138/99 |
| 4,133,557 | 1/1979 | Ahlstone | 29/237 |
| 4,342,338 | 8/1982 | Glennie | 138/99 |
| 4,441,328 | 4/1984 | Brister | 138/97 |

Primary Examiner—John W. Shepperd
Attorney, Agent, or Firm—Pearne, Gordon, Sessions, McCoy, Granger & Tilberry

[57] ABSTRACT

A method and apparatus for installing a split fitting on an intermediate point of a pipeline. The apparatus includes remotely-controlled, power-operated manipulator elements operable to close segments of the fitting about the pipeline in the manner of a clamshell. The manipulator elements include cam means to initially close the fitting segments and C-clamp means to effect full closure of the fitting segments.

18 Claims, 7 Drawing Figures

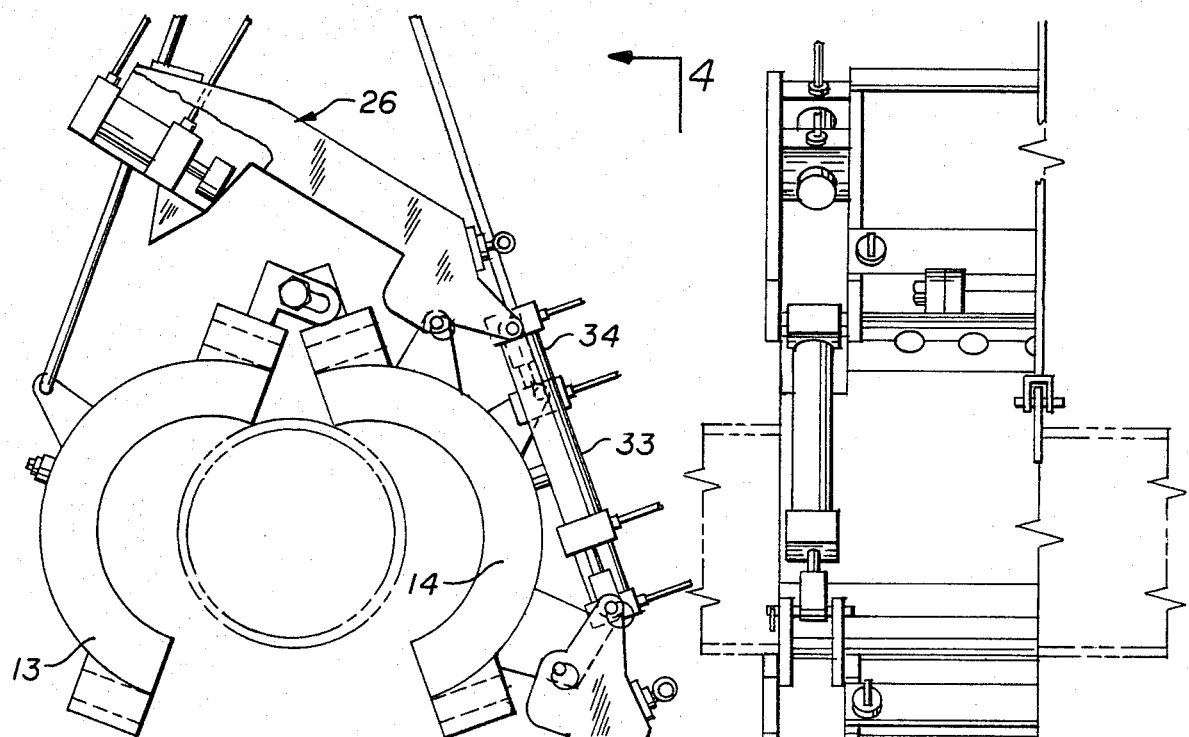
FIG. 3
FIG. 4
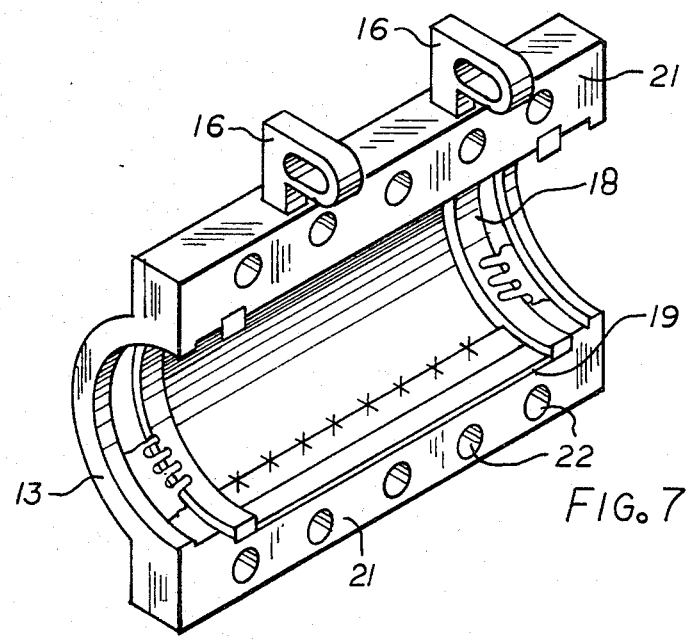
FIG. 7

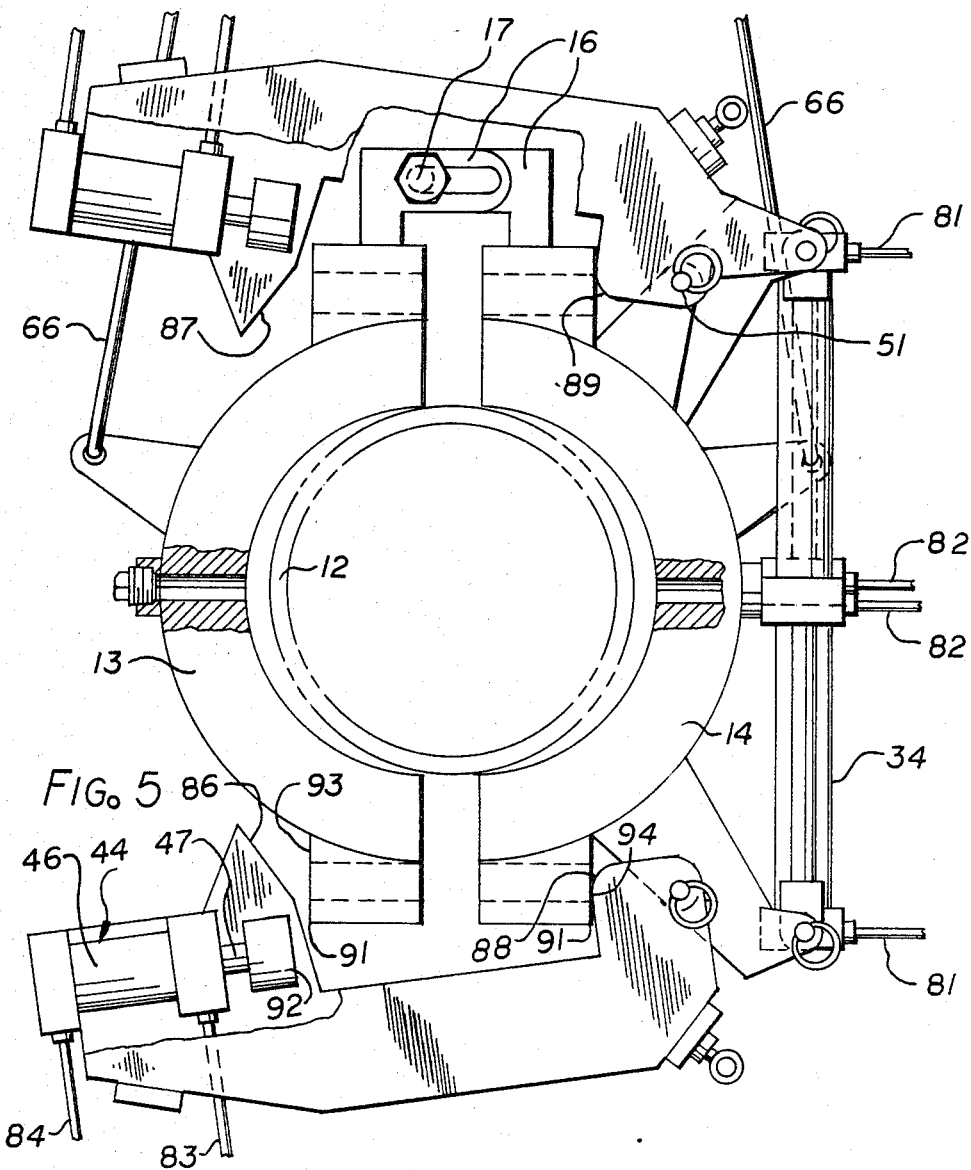
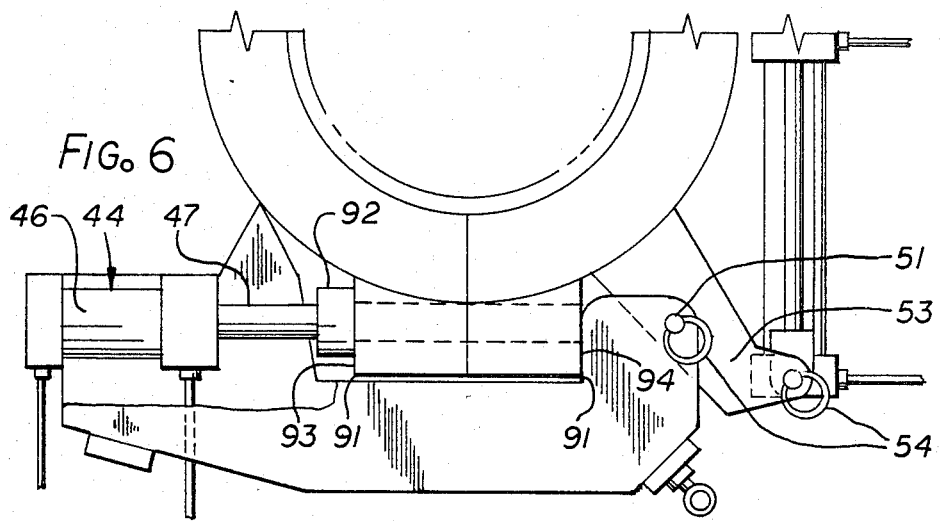

FITTING INSTALLATION DEVICE

BACKGROUND OF THE INVENTION

This invention relates generally to apparatus for installing fittings such as a repair split sleeve on a pipe intermediate its ends and, more particularly, to novel and improved apparatus for the unmanned installation of such a fitting. The present invention also provides a method of installing such fittings.

PRIOR ART

In many instances, it is necessary to install fittings or like devices on a pipeline while the line is in service. For example, such a fitting may be required to repair a break or leak in the pipeline. U.S. Pat. Nos. 3,017,204; 3,078,108; and 3,954,288, all J. B. Smith, disclose repair sleeves or couplings of this general type.

In practice, such fittings are positioned around the pipe over the leak and are bolted in place. In some instances, the fittings are subsequently welded to provide a permanent installation. When these and other fittings or devices must be installed on an underwater pipeline, it is often difficult for a diver to manually position the fitting against the pipe and retain it in position while it is bolted or welded. Such positioning problems are greatly increased when the portion of the pipeline on which the fitting is to be installed is not in an easily accessible position on the floor of the body of water. Further, in some instances, repairs must be made on the pipeline where strong currents are encountered. Such currents greatly increase the diver's problems in positioning the fitting or coupling. In some instances where tidal currents are very strong, a diver can only work for a short period, often less than half an hour when the tide changes.

The time consumed in such installation operations is, of course, important from an installation cost standpoint. In addition, in the case of a leak in the pipe, the cost of escaping materials, as well as the effects thereof on the environment, are important factors.

U.S. Pat. No. 3,685,545 to Smith et al. discloses a system for overcoming certain of the problems encountered in installing a fitting in a hostile environment. This patented system represents a significant advance in the art. There is also a need in on-shore pipeline applications for remote-controlled, power-operated apparatus for installing split fittings where the environment presents a risk to maintenance or construction personnel. For example, the toxicity, temperature, and/or explosiveness of a fluid leaking from a damaged pipe may make it unduly hazardous for personnel to approach the leaking area as long as it remains uncontrolled.

SUMMARY OF THE INVENTION

In accordance with the present invention, a method and apparatus are provided for installing, under remote control, a repair split sleeve or other type of like device on a pipeline. Such method and apparatus, therefore, greatly reduce the risk and effort faced by a workman and, in some instances, make it possible to install such devices under conditions which, in the past, have been considered to be impractical.

The illustrated apparatus incorporating the invention includes power-actuated manipulator means for first closing the mating segments or halves of a split sleeve about a pipeline and then forcibly compressing abutting faces of the sleeve together to contain any leakage from the pipe. The fitting segments are advanced towards and around the pipeline in a posture like that of an open clamshell. Once indexed to the pipeline, the fitting segments are pivoted from a common hinged side into a substantially closed position encircling the wall of the pipeline. The manipulator means, in accordance with the invention, is mounted piggyback-fashion on one of the fitting segments. Consequently, the apparatus does not require a separate frame for its support or for support of the fitting segments. The elimination of a separate frame for the manipulator means greatly reduces the clearance requirements for placement of the fitting and manipulator means.

The small operating envelope required by the apparatus permits its use in areas which are confined or restricted, such as in a cluster of parallel pipes. Similarly, the relatively small space requirements of the apparatus are a significant advantage, for example, in installations on a buried pipeline when surrounding earth must be excavated from the pipe. Since the pocket which must be excavated is small, there is a reduced tendency of cave-ins to occur at the excavation, and shoring, if necessary at all, can be accomplished with minimal work and fixtures.

In the disclosed embodiment, the apparatus includes two sets of opposed C-clamps, one set at each mating line of the fitting segments. Actuators associated with the C-clamps are arranged, upon energization, to swing the clamps from retracted positions to operating positions wherein they bridge abutting flanges of the mating sleeve segments. During their movement from the retracted state to the operative state, cam surface means of the C-clamp sets manipulate the fitting segments from an open clamshell condition to a substantially closed condition. In sequence, following the indexing of the C-clamps onto respective areas of the fitting flanges, the C-clamps are energized to squeeze the flanges tightly together with sufficient force to contain the pressures existing in the pipeline. Thereafter, with the fitting segments installed in their final positions and any leak fully contained, the fitting segments can be manually bolted together in a conventional manner.

The disclosed apparatus is particularly suited for use with the type of split sleeve that provides a fully effective circumferential seal at each end automatically when the longitudinal flanges are drawn tight. This type of fitting can thereby rely on the C-clamp actuators to effectuate both longitudinal and circumferential sealing.

In the preferred embodiment, the C-clamps and C-clamp manipulator means are mounted to the segments with a limited degree of mechanical interconnection. As a result, these clamp and actuator elements can be readily separated after installation of the fitting. In a particularly advantageous manner, the clamps and actuators are secured to the fitting segments with quick-release pins so that they can be separated and recovered in a minimum of time.

BRIEF DESCRIPTION OF THE DRAWINGS

FIG. 3 is an end view of the sleeve and apparatus, similar to FIG. 1 but illustrating the same after they have been advanced over a pipeline;

FIG. 4 is a fragmentary side view of the sleeve and apparatus, taken along the line 4—4 in FIG. 3;

FIG. 5 is an end view similar to FIG. 3, but showing the fitting and apparatus in an advanced stage of installation;

FIG. 6 is a fragmentary view similar to FIG. 5, and showing the device in the completed stage of automatic installation, like FIG. 2; and FIG. 7 is an isometric view of a segment of an exemplary split sleeve fitting.

DESCRIPTION OF THE PREFERRED EMBODIMENT

Figure 1:
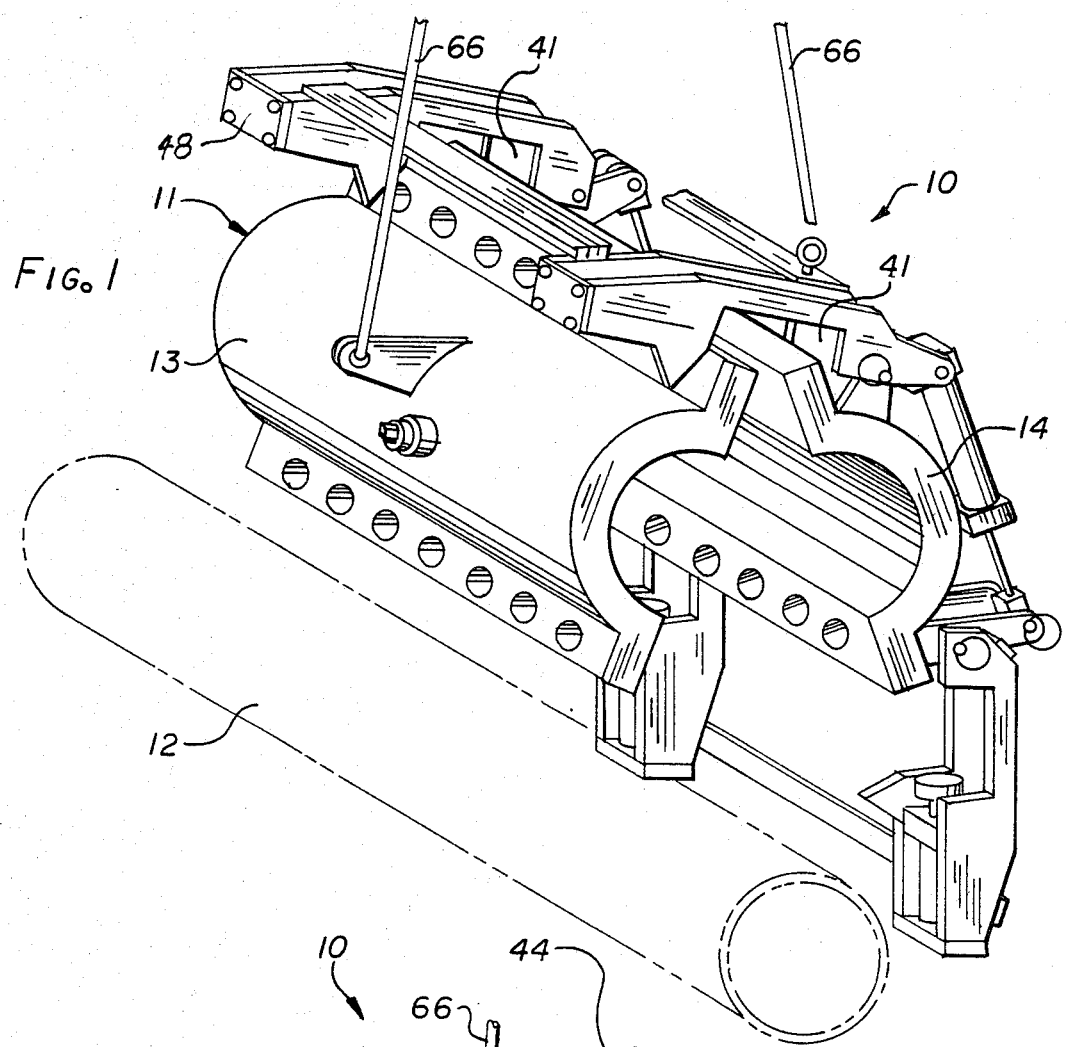
FIG. 1 is an isometric view of a fitting and automatic installation apparatus constructed in accordance with the invention, and shown in an initial stage of installation.

Referring now to the drawings, there is illustrated apparatus 10 used, through remote control, to install a split sleeve 11 on an intermediate point of an existing pipeline shown in phantom at 12. The pipeline 12 ordinarily remains in service during installation of the sleeve 11. The terms "split sleeve" or "split fitting" as used herein mean, by way of example but not by way of limitation, sleeves, couplings, hot tapping repair saddle, repair tees and like fittings which are split longitudinally to permit radial installation on an existing line. In the case of a local rupture in the wall of the pipeline 12, the repair split sleeve 11 is installed to contain leakage. The repair sleeve 11 has separate halves or segments 13 or 14 which, upon installation, provide a single cylindrical unit which encircles the pipe 12 and blocks further escape of material from the pipe. The fitting segments 13, 14 are each provided with a pair of axially spaced L-shaped brackets 16. These brackets 16 cooperate with an elongated pin 17 to form a common hinge for the segments 13,14. The axis of the hinge corresponds with the axis of the pin 17 and is in parallel alignment with the center of the sleeve 11.

FIG. 7 illustrates an exemplary type of split sleeve segment 13. Such sleeves are known, for example, from the aforementioned U.S. Pat. Nos. 3,017,204; 3,078,108; and 3,954,288. Each of the sleeve segments 13,14 includes circumferential seals 18 and longitudinal seals 19 which seal against axial leakage paths and against radial leakage paths, respectively. In order to mechanically join the segment halves 13,14 together, the halves are provided with radially extending flanges 21. The flanges 21 are provided with aligned bores 22 for connection with suitable threaded bolts or like fasteners (not shown). As shown in the Figures, the hinge brackets 16 are welded or otherwise attached to a pair of adjacent flanges 21.

It will be assumed that prior to actual installation of the sleeve 11, any protective coating on the pipeline 12 or any scale, dirt, corrosion, or the like is removed. Moreover, where appropriate, a suitable excavation is made around the pipeline 12.

In the illustrated embodiment, the split sleeve installation apparatus 10 is supported on only one of the sleeve segments or sections 14. The apparatus 10 includes two opposed clamp units 26, 27. Each unit or set 26, 27 includes a pair of longitudinally spaced C-clamps 28, 29, and 30, 31, respectively. As discussed in greater detail below, the clamp units 26,27 are manipulated on the segment 14 by power actuators 33,34.

In the illustrated case, the clamp units 26,27 are fabricated as steel weldments. Each C-clamp 28–31 includes a pair of spaced plates 36 having generally C-shaped profiles when viewed in the axial direction so as to provide opposed jaws 37,38 and an intermediate throat 39. The depth of the throat 39 is relatively shallow compared to its width, as measured by the distance between the opposed jaws 37,38. The plates 36 of each C-clamp 28–31 are typically fixed to one another by a common welded web plate 41 (FIG. 1). The C-clamps 28,29 and 30,31 of each unit or set 26,27 are tied together by welded bars 42,43, which bridge the axial distance between the associated clamps 28–31. At one end of each C-clamp 28–31, there is provided a clamping motor 44 in the form of a hydraulic piston and cylinder actuator. In the illustrated case, each of the clamping actuators 44 is of the double-acting type. An actuator includes a cylinder 46 disposed between the adjacent jaw areas 37 of the plates 36 and a piston rod 47 extendable from the cylinder into the throat 39 of the clamp. The piston end of the actuator cylinder 46 comprises a rectangular plate 48 which is bolted to edges of the C-clamp plates 36 remote from the throat 39.

The clamps 28–31 are pivotally supported on the fitting segment 14 by means of pins 51. The pin 51 for each clamp is assembled through aligned holes in the plates 36 of the jaws 38 and aligned holes in double support brackets 52 and 53.

The support brackets 52,53 are permanently welded to the outside surface of the segment 14. The pins 51, conveniently, are of the commercially available quick-release type having a finger grip ring 54 and a detent ball (not shown) at the opposite end. As indicated in FIGS. 5 and 6, the brackets 52,53 provide the pivot holes for the pins 51 substantially in the plane of the axes of the holes or bores 22 in the adjacent sleeve flange 21 and in a direction parallel to the axis of the sleeve 11.

Figure 2:
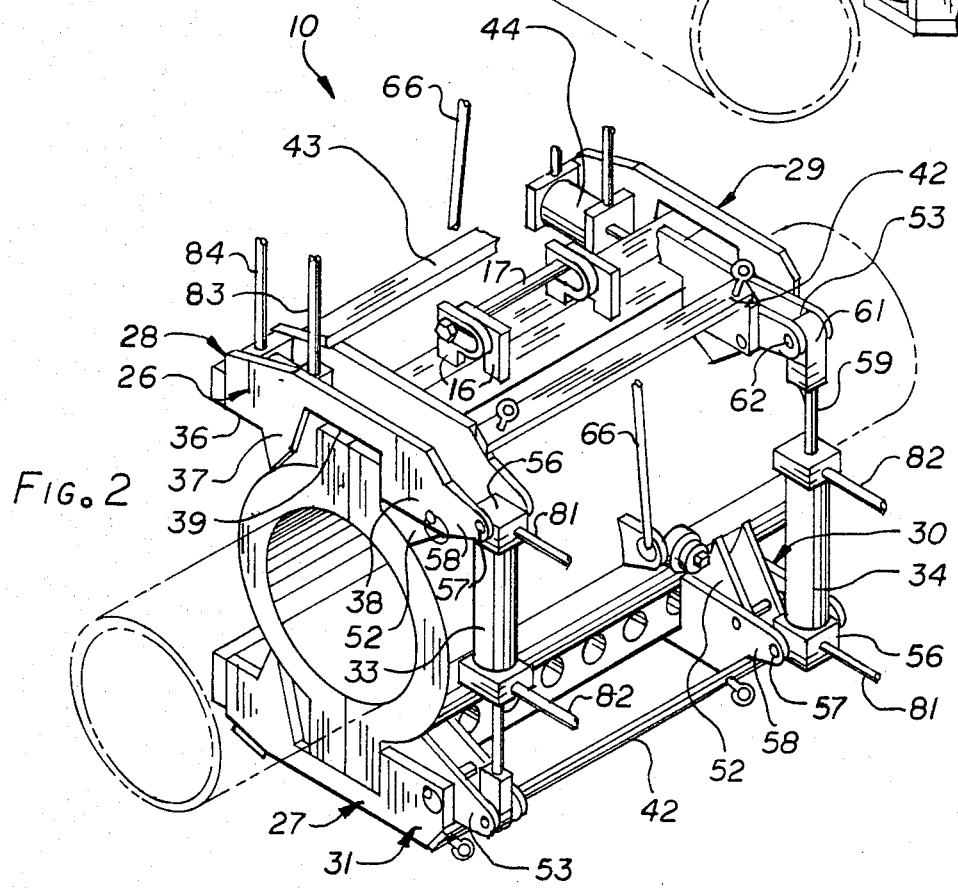
FIG. 2 is an isometric view of the fitting and installation apparatus at a stage of completion.

With reference to FIG. 2, the leftward power actuator 33 manipulates the upper clamp assembly or set 26, and the rightward power actuator 34 manipulates the lower clamp assembly or set 27. The base or piston end 56 of each actuator is trunnion-mounted in holes 57 provided in extensions 58 on associated clamp jaws 38. The free end of the piston rod, designated 59, is provided with a transverse apertured block 61 and pin 62 which pivotally operate in an associated clevis area of the bracket plates 53. The actuators 33, 34 are of the double-acting type so that their rods 59 can be hydraulically operated for extension and retraction.

FIG. 1 illustrates the split fitting 11 and installation apparatus 10, piggyback on the fitting segment 14, in an initial stage of installation. The lower clamp set 27 depends generally vertically from the associated brackets 52,53. The upper clamp set 26 is elevated somewhat from a horizontal position so that it fully clears the adjacent flanges 21 of the split sleeve 11. The sleeve segments 13,14 are aligned relative to one another by the hinge formed by the brackets 16 and pin 17. The split fitting 11 is suspended over the pipeline 12 by a two-strand sling 66 hooked to lifting eyelets welded to the outer surfaces of each of the segments 13, 14. Static forces in the sling 66, segments, 13,14, and hinge elements 16,17 prior to engagement with the pipeline 12 keep the segments in an open clamshell configuration, as indicated in FIGS. 1 and 3. The segments 13,14 and piggyback installation apparatus 10 are progressively lowered or advanced over the pipeline 12. As the segments 13,14 contact the pipeline 12 and the load in the sling strands 66 decreases, the segments hinge toward a closed position as illustrated in FIG. 5. At this stage, where the segments 13,14 have hinged into a partially closed position, the actuators 33,34 are energized to manipulate the segments 13,14 to a still further closed position. A study of the drawings and comprehension of the foregoing description reveals that extension of the piston rods 59 of the actuators 33,34 causes their respective C-clamp sets 26,27 to pivot about the pins 51.

With reference to FIGS. 3 and 5, extension of the actuator rods 59 causes clockwise rotation of the lower clamp set 27 and counterclockwise rotation of the upper clamp set 26. With reference to FIG. 2, pivotal movement imparted to the upper leftward clamp 28 is imposed on the corresponding rightward clamp 29 by the bars 42,43. The same is true for the lower clamp set 27. The hydraulic circuit operating the clamp manipulator actuators 33,34 and clamp motors 44 can include a manifold and suitable sequence valves (not shown) known in the art, and such elements can be conveniently mounted on the bars 42,43.

The actuators 33,34 can be connected in a parallel hydraulic circuit so that they are automatically operated simultaneously or, alternatively, they can be operated by separate control valves. One convenient way of controlling the manipulator actuators 33,34 and clamping actuators 44 is to connect the piston sides of each of the actuators to a common remote line and the rod side of each of the actuators to a separate, single remote line. In the case of the piston chambers of the clamping actuators 44, a sequence valve may be inserted ahead of their branch circuits to isolate or delay their operation until a predetermined pressure is reached in the manipulating actuators 33,34. In this case, where a sequence valve is used in this manner, the upper and lower clamp sets 26,27 will be forced over their respective segment flanges 21. When the pressure has built up in the actuators, 33,34 as a result of the engagement of the clamp jaw areas on the fitting segments 13,14, the clamping actuators 44 are energized. Where a sequence valve is not employed, this sequence of first swinging the clamp sets 26 and 27 over the flanges 21 and then energizing the clamp actuators 44 can be accomplished manually with suitable control valves. It will be understood that energization of the actuators 33, 34, and 44, in any event, is accomplished by supplying pressurized fluid to such actuators through hydraulic lines 81–84 from a remote location by any well-known technique.

As the upper and lower clamp sets 26, 27 move from their open condition of FIG. 3 to the partially closed position of FIG. 5, it can be seen that cam surfaces 86 through 89 associated with the clamp jaws 37,38 are arranged to engage the segment flanges 21 or walls of the segments 13,14 directly to urge the opposed segments towards one another. When the clamp units 26,27 are completely swung over the flanges 21, the flanges are fully received in the clamp throats 39 and the clamping motor piston rods 47 have their axes in substantially parallel alignment with the axis of the flange bores 22. The cam surfaces 86–89 diverge laterally outwardly in a direction away from the throat area 39 of the clamps 28–31. This configuration of the cam surfaces 86–89 permits them to snare or catch outward edges 91 of the flanges 21 and to thereby gather the flanges into the clamp throats 39. During the described pivotal movement of the clamp units 26,27, the piston rods 47 of the clamping actuators 44 are retracted so that cylindrical shoes 92 fixed to the free end of the piston rods 47 are laterally outward of the clamp throats 39.

The power clamping actuators or motors 44 collectively are of sufficient force capacity to maintain the segment halves 13,14 together in fluidtight engagement therebetween and with the pipeline 12 against pressures acting on the interior of the sleeve 11 equal to those prevailing in the pipeline. In the disclosed structure of the apparatus 10, the clamping actuators 44 can be of relatively short stroke, and therefore of relatively low cost. When the clamping actuators 44 have been deployed and a leak through the wall of the pipeline contained within the sleeve 11, bolts or like threaded fasteners can be manually assembled in the aligned bores 22 to permanently secure the sleeve to the pipeline 12. In the normal course, after such bolts have been drawn tight to retain the sleeve 11, the apparatus 10 can be disassembled from the sleeve section 14. This can be first accomplished by reversing the pressure supplied on the clamping actuators 44 so that their piston rods 47 are retracted to release engagement of the shoes 92 with outward surfaces 93,94 of the flanges 21. With the clamping motors 44 in their retracted positions, the pins 51 can be simply pulled out of their associated holes in the brackets 52,53 and clamps 28–31. Similarly, the actuators 33,34 can be disassembled at this time by pulling out the pins 62 in the piston rod blocks 61.

In underwater applications, for example, where it is desired to minimize work performed by a diver, a greater number of C-clamps and power clamping actuators can be provided. In this case, the C-clamps can be disposed along the full length of the split fitting, e.g., at its mid-length, to distribute the force loads on the fitting. The apparatus, once deployed, is left in place indefinitely.

Although the preferred embodiment of this invention has been shown and described, it should be understood that various modifications and rearrangements of the parts may be resorted to without departing from the scope of the invention as disclosed and claimed herein.

What is claimed is:

1. Apparatus for remotely installing a fluidtight split fitting on an intermediate location of a pipeline, the fitting being split longitudinally into mating segments and being provided with means for hinging the segments together in the manner of a clamshell, manipulator means mounted on the segments and being constructed and arranged to engage portions of the segments and forcibly close them together into fluidtight mating contact with one another, said manipulator means including C-shaped clamp means and power operated means for moving said clamp means relative to said segments, said clamp means including power-operated means, said clamp means being movable by said power operated means from a retracted position to an operational position, said clamp means in said retracted position allowing said segments, while hinged together, to pass onto the pipeline at said location and in said operational position being disposed adjacent a line at which the fitting is split and bridging a gap between the segments at such line, the poweroperated means being arranged to engage and maintain the segments closed in fluidtight relation against forces developed by pressure prevailing in the pipeline.

2. Apparatus as set forth in claim 1, wherein said clamp means is pivotally mounted directly on one of said segments.

3. Apparatus as set forth in claim 1, wherein said manipulator means is supported on said split fitting through quick-disconnect pins whereby said pins can be separated from said split fitting with limited effort and use of tools.

4. Apparatus as set forth in claim 1, wherein said C-clamp means includes surfaces adapted to engage surface portions of said segments on opposite sides of and adjacent said line and squeeze said segments together.

5. Apparatus as set forth in claim 4, wherein said power-operated means is remotely actuatable for both squeezing and releasing said segments.

6. Apparatus as set forth in claim 4, wherein said C-shaped clamp means has a pair of opposed jaws and is pivotally supported on one of said segments adjacent one jaw thereof, said power-operated means being associated with the opposite jaw.

7. Apparatus as set forth in claim 1, wherein said C-shaped clamp means is pivotally supported on one of said segments, said C-shaped clamp means being arranged, in a retracted position, to extend along a plane generally parallel to the direction the split sleeve is advanced over the pipeline whereby the apparatus has a relatively small space requirement for its installation.

8. Apparatus for installing a fluidtight split fitting on an intermediate location of a pipeline, the fitting being split longitudinally into mating half-segments, said segments being provided with means for hinging the segments together at one side in the manner of a clamshell and with radially extending flange elements at an opposite side, manipulator elements including C-clamp means pivotally supported on one of said segments about an axis parallel to the axis of the fitting, power actuator means operative to swing the C-clamp means from a pipeline clearance position wherein the C-clamp means extends generally parallel to a plane bisecting the angle formed by the opposed faces of the fitting halves to an operational position wherein the C-clamp means extends generally transverse to the mating plane of said segment halves when they are closed over the pipeline such that it bridges said flange elements of both segments, said C-clamp means including means to squeeze said fitting segments with sufficient force to contain pressure therein.

9. Apparatus as set forth in claim 8, including power clamping means carried on said C-clamp means for squeezing said segments together independently of operation of said power actuator means.

10. Apparatus as set forth in claim 9, wherein said power clamping means is disposed adjacent an end of said C-clamp means remote from the area of pivoting of said C-clamp means whereby it is adapted to drive the other one of said segments toward one said segment.

11. A power-operated manipulator for installing a longitudinally split fitting at an intermediate point on a pipeline, the fitting including a pair of opposed sections adapted to mate in a plane diametral to the pipeline and being hinged together at one side in the manner of a clamshell, each fitting section including radially extending flanges on both of its diametrally opposed sides, the flanges of one segment being adapted to mate with the flanges of the other, separate C-clamp means associated with each pair of mating flanges, the C-clamp means including opposed jaw elements spaced by a throat, each C-clamp means being adapted to be supported on a fitting segment by a pivot having an axis parallel to the axis of the fitting, the support pivot being adjacent one of the jaws of the C-clamp means, each C-clamp means being pivotal between a respective retracted position and a respective extended operational position, the C-clamp means in their respective retracted positions being clear of the associated segment flanges to permit the segments to hinge open a sufficient distance to advance over the pipeline, the C-clamp means in their respective extended positions bridging associated segment flanges such that the segment flanges are received in the throats of the C-clamp means, power actuator means adapted to be supported on the fitting, said power actuator means being operative to forcibly move said C-clamp means between their retracted and operative positions, said C-clamp means including force-applying means at their jaws for engaging the segment flanges to press the segments together and contain fluid in the fitting.

12. A power-operated manipulator as set forth in claim 11, wherein said C-clamp means includes cam surface means for urging said segments towards one another as they pivot from their retracted to their extended positions.

13. A power-operated manipulator as set forth in claim 12, wherein said force-applying means includes power clamping means operable independently of operation of such power actuator means.

14. A power-operated manipulator as set forth in claim 13, wherein said force-applying means includes a lineal actuator on said C-clamp means on the jaw thereof remote from said pivot.

15. A power-operated manipulator for installing a longitudinally split fitting at an intermediate point on a pipeline, the fitting including a pair of opposed sections adapted to mate in a plane diametral to the pipeline and being hinged together at one side in the manner of a clamshell, each fitting section including radially extending flanges on both of its diametrally opposed sides, the flanges of one segment being adapted to mate with the flanges of the other, separate C-clamp means associated with each pair of mating flanges, the C-clamp means including opposed jaw elements spaced by a throat, each C-clamp means being adapted to be supported on a fitting segment by a pivot, the support pivot being adjacent one of the jaws of the C-clamp means, each C-clamp means being pivotal between a respective retracted position and a respective extended operational position, power actuator means adapted to be supported on the fitting, said power actuator means being operative to forcibly move said C-clamp means between their retracted and operative positions, the C-clamp means in their respective retracted positions being clear of the associated segment flanges to permit the segments to hinge open a sufficient distance to advance over the pipeline, the C-clamp means in their respective extended positions bridging associated segment flanges such that the segment flanges are received in the throats of the C-clamp means, said C-clamp means including force-applying means at their jaws for engaging the segment flanges to press the segments together and contain fluid in the fitting.

16. A method of assembling a fitting on the intermediate length of a pipeline including the steps of supplying a longitudinally split fitting of mating half segments, the segments being provided with means for hinging the segments together at one side in the manner of a clamshell and with radially extending flange elements at an opposite side, mounting manipulator means including a power actuator and C-clamp means on one of the segments in a manner permitting such hinged segments to assume a pipeline clearance position wherein the segments can pass over the pipeline while hinged together and an operational position wherein the segments encircle the pipeline, using the power actuator of the manipulator means to move the C-clamp means from a retracted position permitting passage of said segments over the pipeline to an operational position wherein the C-clamp means extends generally transverse to the mating plane of said segments when they are closed over the pipeline such that it bridges said flange elements of both segments, and using means on said C-clamp means to squeeze said segments together through said flange elements.

17. A method as set forth in claim 16, wherein said flange elements of each segment are provided with aligned apertures and threaded bolts are assembled through and tightened in the aligned apertures to secure the segments together after said flange elements are squeezed together with said clamp means.

18. A method as set forth in claim 17, wherein said fitting is provided at each end with circumferential seals engageable with the exterior of the pipeline when the fitting is fully closed about the pipeline.

* * * * *